United States Patent
Pham et al.

(10) Patent No.: US 9,490,640 B2
(45) Date of Patent: Nov. 8, 2016

(54) TEMPERATURE MONITORING HEV CHARGER CORD ASSEMBLY AND CHARGING METHOD

(71) Applicant: FORD GLOBAL TECHNOLOGIES, LLC, Dearborn, MI (US)

(72) Inventors: Thanh D. Pham, Canton, MI (US); Wayne Haider, Dearborn, MI (US); James J Gibbons, Milford, MI (US); Wayne Michael Thompson, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 402 days.

(21) Appl. No.: 14/132,607

(22) Filed: Dec. 18, 2013

(65) Prior Publication Data

US 2015/0171646 A1    Jun. 18, 2015

(51) Int. Cl.
| | |
|---|---|
| H01M 10/44 | (2006.01) |
| H01M 10/46 | (2006.01) |
| H02J 7/00 | (2006.01) |
| B60L 11/18 | (2006.01) |
| H02J 7/04 | (2006.01) |

(52) U.S. Cl.
CPC .......... *H02J 7/0029* (2013.01); *B60L 11/1818* (2013.01); *H02J 7/0091* (2013.01); *H02J 7/047* (2013.01)

(58) Field of Classification Search
CPC .... H02J 7/0021; H02J 7/0026; H02J 7/0029; H02J 7/0042; H02J 7/355; H02J 7/047
USPC .............. 320/104, 107, 109, 111, 115, 150
See application file for complete search history.

(56) References Cited

U.S. PATENT DOCUMENTS

| | | | |
|---|---|---|---|
| 5,188,542 A | 2/1993 | Ballman | |
| 5,576,610 A | 11/1996 | Patino et al. | |
| 5,777,868 A | 7/1998 | Gibboney | |
| 8,723,477 B2* | 5/2014 | Gaul ................ | B60L 3/0069 320/109 |
| 2010/0052615 A1* | 3/2010 | Loncarevic ........ | H02J 7/0016 320/118 |
| 2010/0188053 A1* | 7/2010 | Carkner ............. | H02J 7/0091 320/152 |
| 2012/0119702 A1 | 5/2012 | Gaul et al. | |
| 2012/0206100 A1 | 8/2012 | Brown et al. | |
| 2013/0335024 A1* | 12/2013 | Akai et al. ......... | H01M 10/44 320/109 |

FOREIGN PATENT DOCUMENTS

EP        2502778 A2    9/2012

* cited by examiner

*Primary Examiner* — Edward Tso
(74) *Attorney, Agent, or Firm* — David Kelley, Esq.; Tung & Associates

(57) ABSTRACT

A temperature monitoring vehicle charger cord assembly includes a wall plug; a pair of power prongs carried by the wall plug; at least one thermal sensor carried by the wall plug, the at least one thermal sensor adapted to monitor a charging temperature; a battery electric vehicle electrical plug; and a microprocessor electrically interfacing with the power prongs, the at least one thermal sensor and the battery electric vehicle electrical plug. The microprocessor is programmed to perform at least one of terminating electrical current and reducing amperes of electrical current flowing from the pair of power prongs to the battery electric vehicle electrical plug if the charging temperature at least meets a predetermined maximum threshold charging temperature. A temperature monitoring vehicle charging method is also disclosed.

16 Claims, 4 Drawing Sheets

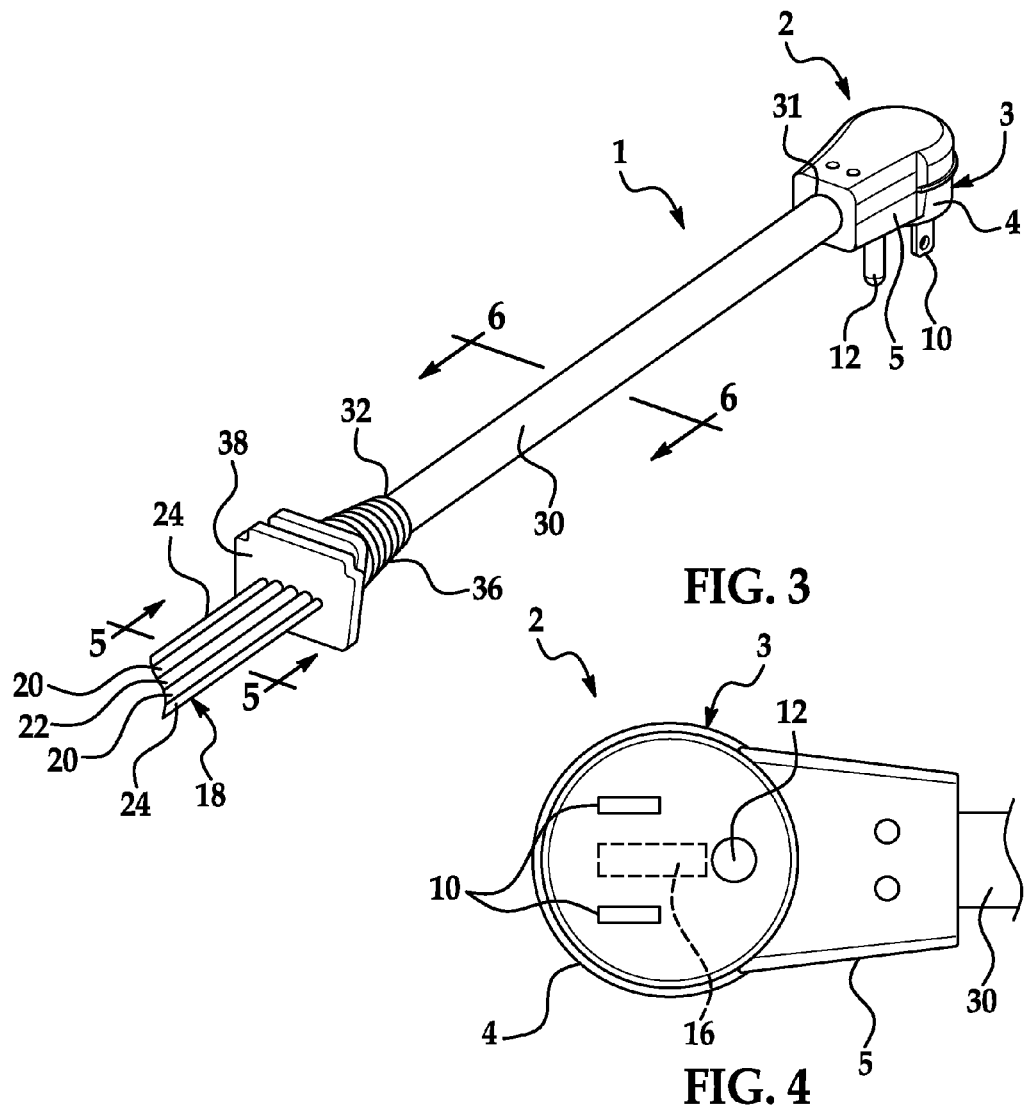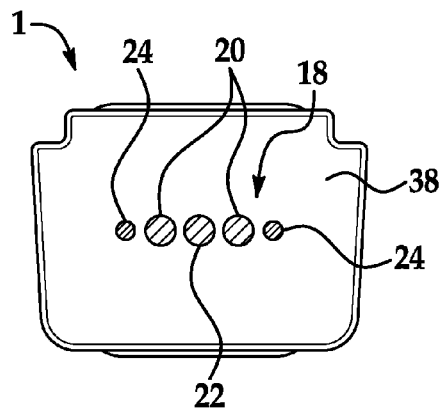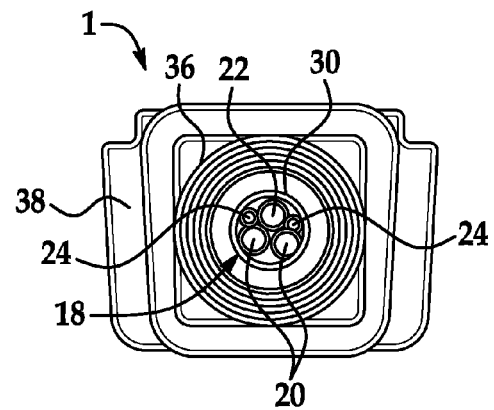

US 9,490,640 B2

TEMPERATURE MONITORING HEV CHARGER CORD ASSEMBLY AND CHARGING METHOD

FIELD

Illustrative embodiments of the disclosure generally relate to Hybrid Electric Vehicles (HEVs). More particularly, illustrative embodiments of the disclosure relate to an HEV charger cord assembly and charging method in which temperatures incurred during electrical charging of an HEV are monitored and controlled.

BACKGROUND

Battery Electric Vehicles (BEVs) and plug-in hybrid electric vehicles (PHEVs) require the use of an electric vehicle supplied equipment (EVSE) 110V AC charger cord set which allows a vehicle operator to charge the vehicle in a garage or at other locations having a 110 VAC outlet. The cord set may require a 15-20 amp circuit and may draw up to 15 amps of current during charge.

Accordingly, an HEV charger cord assembly and charging method in which temperatures incurred during electrical charging of an HEV are monitored and controlled.

SUMMARY

Illustrative embodiments of the disclosure are generally directed to a temperature monitoring vehicle charger cord assembly. An illustrative embodiment of the assembly includes a wall plug; a pair of power prongs carried by the wall plug; at least one thermal sensor carried by the wall plug, the at least one thermal sensor adapted to monitor a charging temperature; a battery electric vehicle electrical plug; and a microprocessor electrically interfacing with the power prongs, the at least one thermal sensor and the battery electric vehicle electrical plug. The microprocessor is programmed to perform at least one of terminating electrical current and reducing amperes of electrical current flowing from the pair of power prongs to the battery electric vehicle electrical plug if the charging temperature at least meets a predetermined maximum threshold charging temperature.

Illustrative embodiments of the disclosure are further generally directed to a temperature monitoring HEV charging method. An illustrative embodiment of the method includes monitoring a charging temperature, comparing the charging temperature to a maximum threshold charging temperature and performing at least one of terminating electrical charge current and reducing amperes of electrical charge current if the charging temperature at least meets the maximum threshold charging temperature.

BRIEF DESCRIPTION OF THE DRAWINGS

Illustrative embodiments of the disclosure will now be described, by way of example, with reference to the accompanying drawings, in which:

FIG. 3 is a perspective view, partially in section, of an illustrative embodiment of the temperature monitoring HEV charger cord assembly;

FIG. 4 is a bottom view of an exemplary wall plug component of an illustrative embodiment of the temperature monitoring HEV charger cord assembly;

FIG. 5 is a sectional view, taken along section lines 5-5 in FIG. 3;

FIG. 6 is a sectional view, taken along section lines 6-6 in FIG. 3;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 7:
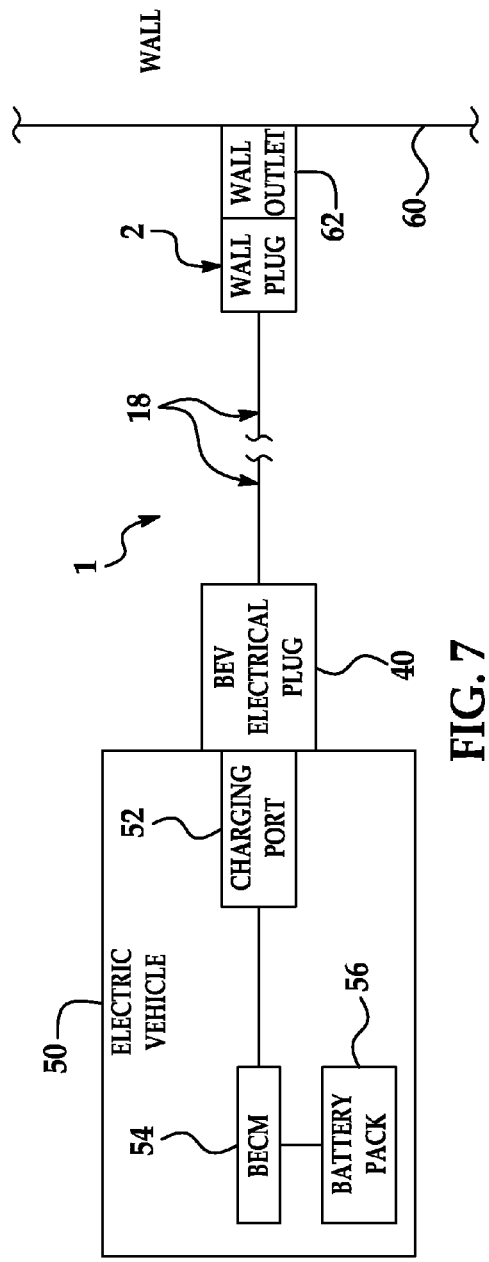
FIG. 7 is a schematic diagram of an HEV in exemplary application of an illustrative embodiment of the temperature monitoring HEV charger cord assembly.
Figure 8:
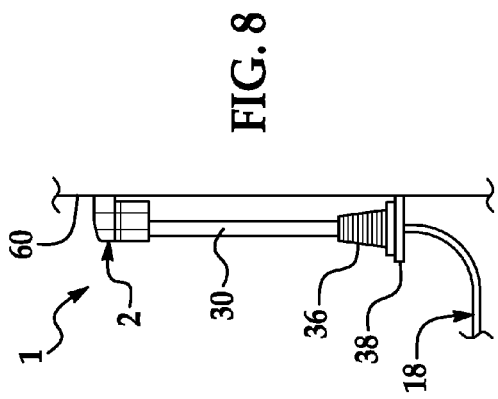
FIG. 8 is a side view of a portion of the illustrative temperature monitoring HEV charger cord assembly, with the wall plug inserted in a wall outlet in exemplary application of the assembly.

Referring initially to FIGS. 1-8, an illustrative embodiment of the temperature monitoring HEV charger cord assembly, hereinafter assembly, is generally indicated by reference numeral 1 in FIGS. 2-6. As shown in FIGS. 7 and 8 and will be hereinafter described, the assembly 1 may be used to connect a wall outlet 62 or other electrical outlet or socket to a charging port 52 on a BEV (Battery Electric Vehicle) 50 for the purpose of charging a battery pack 56 onboard the BEV 50 from the wall outlet 62. In some applications, the wall outlet may include a standard or conventional 110 VAC electrical socket. The wall outlet 62 may be installed in a wall 60 of a garage or other structure.

Figure 1:
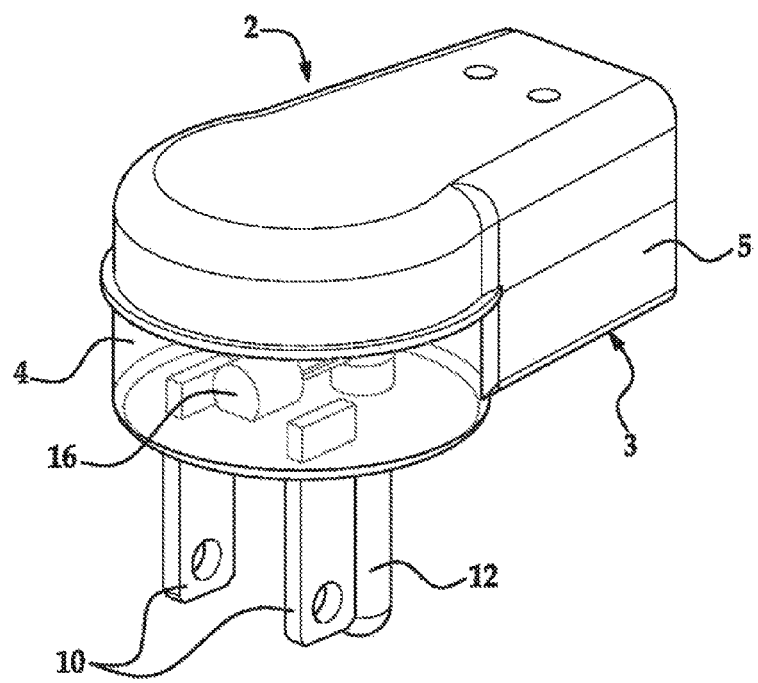
FIG. 1 is a perspective view of an exemplary wall plug component of an illustrative embodiment of the temperature monitoring HEV charger cord assembly.

The assembly 1 may include a wall plug 2. The wall plug 2 is adapted to mechanically and electrically interface with the wall outlet 62. As shown in FIGS. 1, 3 and 4, in some embodiments, the wall plug 2 of the assembly 1 may include a wall plug housing 3. The wall plug housing 3 may be plastic or other material and may include a generally semi-cylindrical sensor housing portion 4 and a housing extension portion 5 which extends from the sensor housing portion 4. A pair of spaced-apart power prongs 10, each of which is an electrically-conductive material, extends from the sensor housing portion 4. An electrically-conductive ground prong 12 extends from the sensor housing portion 4 generally between and in spaced-apart relationship to the power prongs 10.

As shown in FIGS. 1 and 4, at least one thermal sensor 16 is provided in the sensor housing portion 4 of the well plug housing 3. The thermal sensor 16 may include any device or material which is capable of sensing an elevation in temperature inside the sensor housing portion 4. In some embodiments, the thermal sensor 16 may include at least one thermistor, which is a type of resistor the resistance of which varies significantly with temperature. The thermistor may include a ceramic or polymer material as is known by those skilled in the art. In some embodiments, the thermal sensor 16 may be disposed between the power prongs 10 inside the sensor housing portion 4 of the wall plug housing 3, as shown in FIG. 1.

A pair of power prong wires 20 (FIG. 6) may be disposed in electrical contact with the respective power prongs 10 on the wall plug 2. A ground prong wire 22 may be disposed in electrical contact with the ground prong 12. A pair of thermal sensor wires 24 may be disposed in electrical contact with the thermal sensor 16 in the wall plug housing 3 of the wall plug 2. In some embodiments, the power prong wires 20, the ground prong wire 22 and the thermal sensor wires 24 may be routed together in a flexible wiring bundle 18.

In some embodiments, a wiring conduit 30 may extend from the housing extension portion 5 of the wall plug housing 3. The wiring conduit 30 may be plastic or other rigid or semi-rigid material and may have a wall plug end 31 at the wall plug housing 3 and a connector end 32 opposite the wall plug end 31. A flexible conduit connector 36 may terminate the connector end 32 of the wiring conduit 30. A conduit spacer flange 38 may terminate the conduit connector 36 for purposes which will be hereinafter described. As shown in FIG. 5, the power prong wire 20, the ground prong wire 22 and the thermal sensor wires 24 of the wiring bundle 18 may extend from the wiring conduit 30 (FIG. 3) through corresponding wire openings (not illustrated) in the conduit spacer flange 38.

Figure 2:
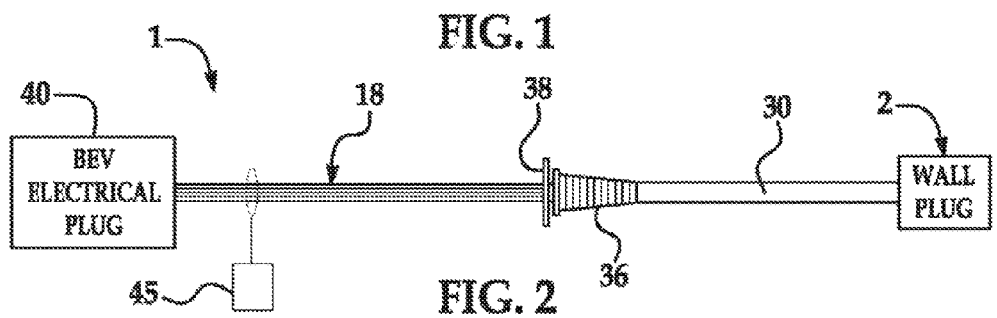
FIG. 2 is a schematic diagram of an illustrative embodiment of the temperature monitoring HEV charger cord assembly.

As shown in FIG. 2, a BEV (Battery Electric Vehicle) electrical plug 40 may terminate the wiring bundle 18. The BEV electrical plug 40 may be a standard or conventional plug which interfaces with the charging port 52 (FIG. 7) on the BEV 50. Standard or conventional BEV electrical plugs are well known by those skilled in the art and need not be discussed herein in detail.

Figure 2A:
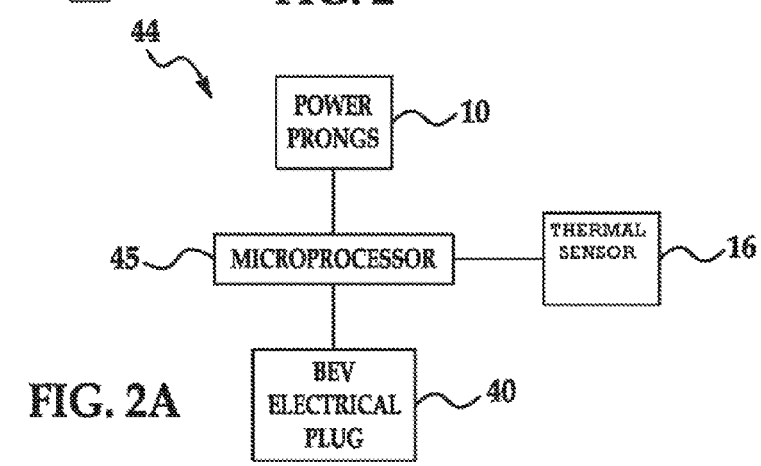
FIG. 2A is a block diagram of an exemplary control circuit which is suitable for implementation of an illustrative embodiment of the temperature monitoring HEV charger cord assembly.

An exemplary control circuit 44 which is suitable for implementation of an illustrative embodiment of the assembly 1 is shown in FIG. 2A. The control circuit 44 may include a microprocessor 45 in communication with associated non-transitory memory storage media. The power prongs 10 and the thermal sensor 16 in the wall plug 2, and the BEV electrical plug 40, may electrically interface with the microprocessor 45. In application of the assembly 1, throughout charging of the BEV 50 (FIG. 7), the thermal sensor 16 monitors and reports the monitored temperature inside the sensor housing portion 4 of the wall plug housing 3 to the microprocessor 45. The microprocessor 45 may be programmed to compare the monitored temperature as reported by the thermal sensor 16 to a predetermined maximum threshold charging temperature previously stored in the microprocessor 45. In some embodiments, the microprocessor 45 may be programmed to maintain electrical contact between the power prongs 10 and the BEV electrical plug 40 as long as the monitored temperature remains below the predetermined maximum threshold charging temperature. The microprocessor 45 may be programmed to terminate further flow of electrical current from the power prongs 10 to the BEV electrical plug 40 in the event that the monitored temperature reaches or exceeds the maximum threshold charging temperature. In other embodiments, the microprocessor 45 may be programmed to reduce the amperes of electrical current which flows to the BEV electrical plug 40 in the event that the monitored temperature reaches or exceeds the maximum threshold charging temperature. In some embodiments, the microprocessor 45 may be programmed to re-establish flow of electrical current or increase the amperes of electrical current which flows from the power prongs 10 to the BEV electrical plug 40 in the event that the wall plug 2 cools until the monitored temperature falls below the maximum threshold charging temperature.

As shown in FIGS. 7 and 8, in exemplary application of the assembly 1, the BEV electrical plug 40 of the assembly 1 is connected to the charging port 52 on the BEV 50. The wall plug 2 of the assembly 1 is connected to the wall outlet 62 in the wall 60. As shown in FIG. 8, in some embodiments, the wiring conduit 30 may extend downwardly from the wall plug 2 adjacent to the wall 60. The conduit spacer flange 38 may engage the wall 60 to maintain spacing between the wiring conduit 30 and the wall 60. The wiring bundle 18 may extend horizontally from the conduit spacer flange 38 to the BEV electrical plug 40 at the charging port 52 of the BEV 50.

The microprocessor 45 (FIG. 2A) of the control circuit 44 normally maintains electrical contact between the power prongs 10 on the wall plug 2 and the BEV electrical plug 40. Accordingly, electrical current flows from the wall outlet 62 through the power prongs 10, the power prong wires 20, the microprocessor 45 and the BEV electrical plug 40, respectively, of the assembly 1 and then through the charging port 52 and the BECM (Battery Energy Control Module) 54 and into the battery pack 56, respectively, of the BEV 50. Throughout the charging operation, the thermal sensor 16 continually monitors the temperature in the interior of the wall plug housing 3 of the wall plug 2. As long as the monitored temperature remains below the predetermined maximum threshold charging temperature which was previously programmed into the microprocessor 45, the microprocessor 45 maintains flow of electrical current from the power prongs 10 to the BEV electrical plug 40. However, in the event that the monitored temperature which is reported by the thermal sensor 16 meets or exceeds the maximum threshold charging temperature, the microprocessor 45 may either terminate further flow of electrical current or reduce the amperes of electrical current flowing from the power prongs 10 to the BEV electrical plug 40. Therefore, the temperature of the wall plug 2 remains within acceptable limits to ensure safety to the garage or other structure in which charging is being carried out. In some embodiments, the microprocessor 45 may re-establish flow of electrical current or increase the amperes of electrical current flowing from the power prongs 10 to the BEV electrical plug 40 in the event that the wall plug 2 cools until the monitored temperature falls below the maximum threshold charging temperature. After charging of the battery pack 56 is completed, the charging operation may be terminated.

Figure 9:
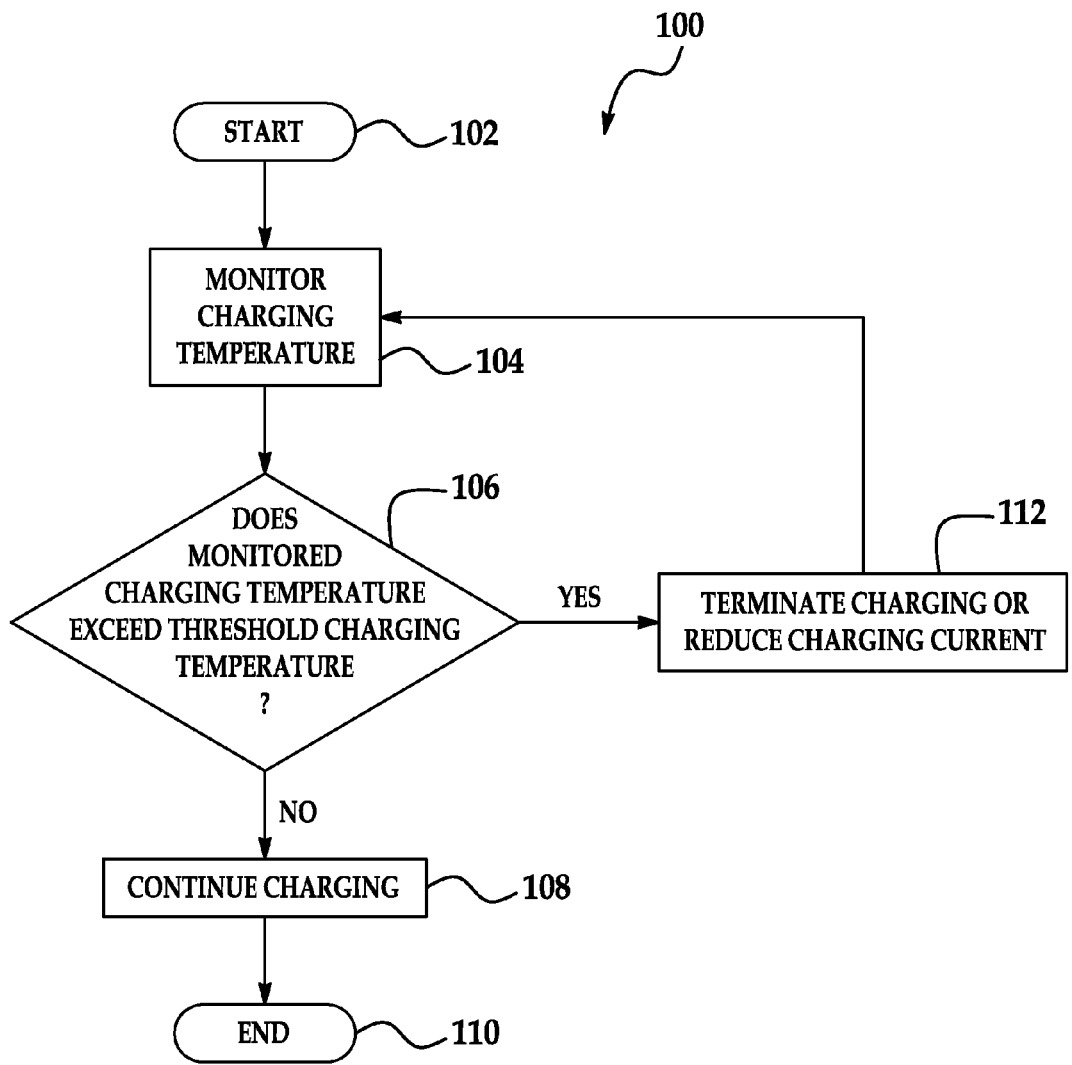
FIG. 9 is a flow diagram of an illustrative embodiment of a temperature monitoring HEV charging method.

Referring next to FIG. 9, a flow diagram 100 of an illustrative embodiment of a temperature monitoring HEV charging method is shown. The method may begin at block 102. At block 104, a charging temperature may be monitored. At block 106, a determination may be made as to whether the monitored charging temperature meets or exceeds a predetermined maximum threshold charging temperature. If yes, then the charging operation may be terminated or the amperes of the electrical current may be reduced at block 112. If not, then the charging operation may continue at block 108. The method may end at the termination of the charging operation at block 110.

In some embodiments, after the charging operation is terminated or the amperes of the electrical current is reduced at block 112, the charging temperature may continue to be monitored at block 104. The determination may again be made as to whether the monitored charging temperature meets or exceeds a predetermined maximum threshold charging temperature at block 106. If yes, then the charging operation may be terminated or the amperes of the electrical current may be reduced again at block 112. If not, then the charging operation may continue at block 108.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A temperature monitoring vehicle charger cord assembly, comprising:
    a wall plug;
    a pair of power prongs carried by the wall plug; at least one thermal sensor carried by the wall plug, the at least one thermal sensor configured to monitor a charging temperature, the charging temperature associated with at least a portion of the wall plug;
    a battery electric vehicle electrical plug; and
    a microprocessor electrically interfacing with the power prongs, the at least one thermal sensor and the battery electric vehicle electrical plug, the microprocessor configured to execute programmed instructions stored in non-transitory memory, said microprocessor configured to cause the performance of at least one of terminating electrical current and reducing amperes of electrical current flowing from the pair of power prongs to the battery electric vehicle electrical plug if the charging temperature is determined by the microprocessor to at least meet a predetermined maximum threshold charging temperature.

2. The assembly of claim 1 further comprising a ground prong electrically interfacing with the battery electric vehicle electrical plug.

3. The assembly of claim 1 further comprising a wiring bundle electrically connecting the pair of power prongs to the battery electric vehicle electrical plug.

4. The assembly of claim 3 further comprising a wiring conduit carried by the wall plug, and wherein the wiring bundle extends through the wiring conduit.

5. The assembly of claim 4 further comprising a conduit spacer flange carried by the wiring conduit.

6. The assembly of claim 1 wherein the at least one thermal sensor comprises at least one thermistor.

7. The assembly of claim 6 wherein the at least one thermistor is a ceramic or polymer material.

8. The assembly of claim 1 wherein the wall plug comprises a generally semi-cylindrical sensor housing portion and a housing extension portion extending from the sensor housing portion, and the at least one thermal sensor is contained in the sensor housing.

9. A temperature monitoring vehicle charger cord assembly, comprising:
    a wall plug;
    a pair of power prongs carried by the wall plug;
    at least one thermal sensor carried by the wall plug, the at least one thermal sensor configured to monitor a charging temperature, the charging temperature associated with at least a portion of the wall plug;
    a battery electric vehicle electrical plug;
    a microprocessor electrically interfacing with the power prongs, the at least one thermal sensor and the battery electric vehicle electrical plug, the microprocessor configured to execute programmed instructions stored in non-transitory memory, said microprocessor configured to cause the performance of at least one of terminating electrical current and reducing amperes of electrical current flowing from the pair of power prongs to the battery electric vehicle electrical plug if the charging temperature is determined by the microprocessor to at least meet a predetermined maximum threshold charging temperature; and
    the microprocessor further configured to cause reestablishment of electrical current flowing from the pair of power prongs to the battery electric vehicle electrical plug if the charging temperature falls below the predetermined maximum threshold charging temperature after the charging temperature at least meets the predetermined maximum threshold charging temperature.

10. The assembly of claim 9 further comprising a ground prong electrically interfacing with the battery electric vehicle electrical plug.

11. The assembly of claim 9 further comprising a wiring bundle electrically connecting the pair of power prongs to the battery electric vehicle electrical plug.

12. The assembly of claim 11 further comprising a wiring conduit carried by the wall plug, and wherein the wiring bundle extends through the wiring conduit.

13. The assembly of claim 12 further comprising a conduit spacer flange carried by the wiring conduit.

14. The assembly of claim 9 wherein the at least one thermal sensor comprises at least one thermistor.

15. The assembly of claim 14 wherein the at least one thermistor is a ceramic or polymer material.

16. The assembly of claim 9 wherein the wall plug comprises a generally semi-cylindrical sensor housing portion and a housing extension portion extending from the sensor housing portion, and the at least one thermal sensor is contained in the sensor housing.

* * * * *